Patented July 9, 1940

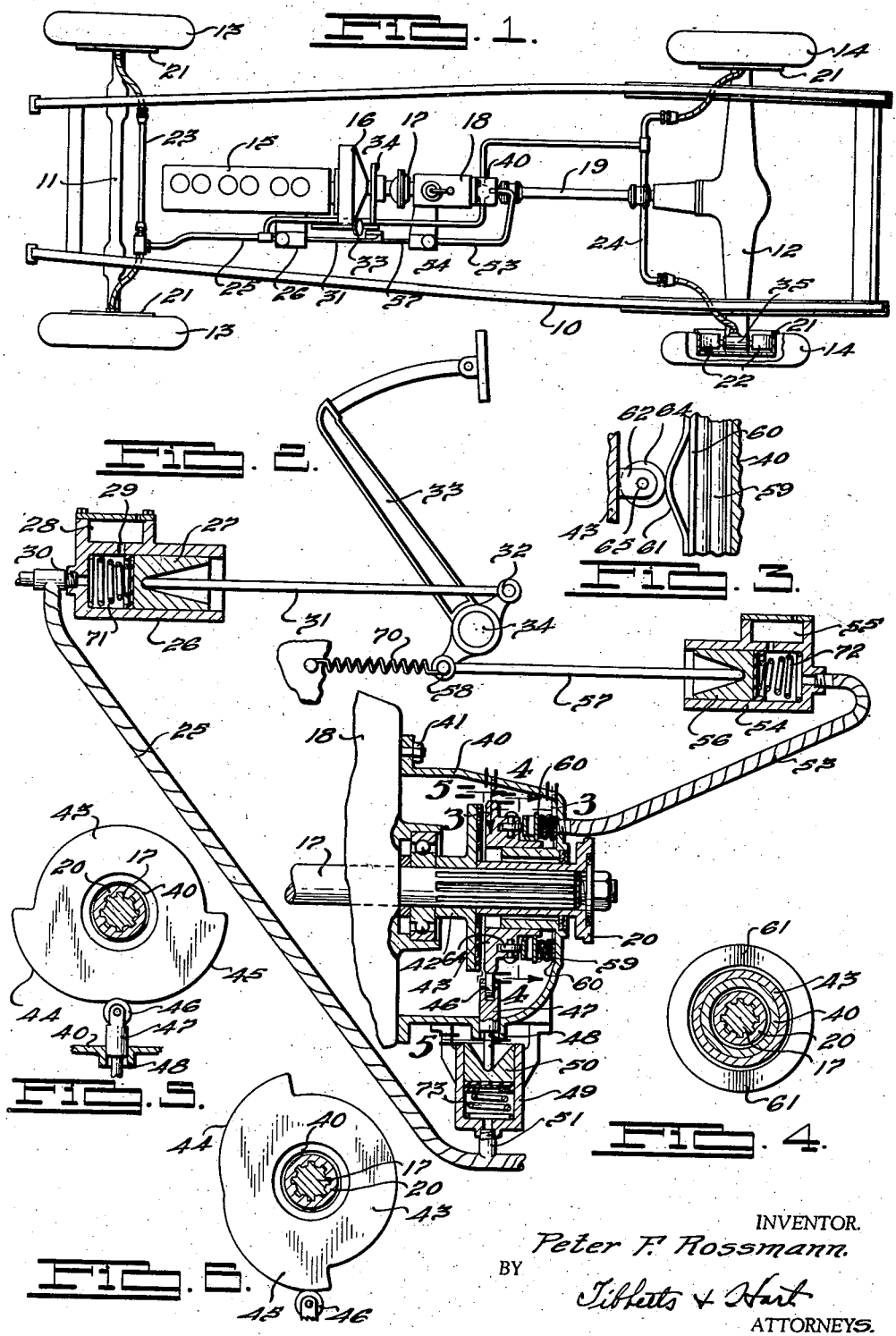

2,206,976

UNITED STATES PATENT OFFICE 2,206,976

MOTOR VEHICLE BRAKING SYSTEM

Peter F. Rossmann, Detroit, Mich., assignor to Packard Motor Car Company, Detroit, Mich., a corporation of Michigan Application December 3, 1936, Serial No. 114,044

4 Claims. (Cl. 188—152)

This invention relates to hydraulic actuating systems and more particularly to hydraulic braking means for motor vehicle wheels.

Physical force is applied in many types of hydraulic actuating systems to make them effective for operating mechanisms. The physical effort required with such systems is often greater than the average person cares to exert and especially when the applications are frequent. For example, the operation of motor vehicles in heavy traffic requires frequent actuation of the brakes and the physical effort required of the operator for this purpose is fatiguing.

It is an object of this invention to reduce the physical effort required to apply fluid pressure in the actuation of mechanism, such as braking mechanism for motor vehicles.

Another object of the invention is to provide a fluid actuating mechanism in which pressure is exerted jointly on the fluid by the application of physical force and mechanically developed force under physical control.

Another object of the invention is to provide a braking system for motor vehicles that can be operated with minimum physical exertion.

Another object of the invention is to relieve the driver of some of the physical effort now required in applying the brakes of a motor vehicle.

Other objects of the invention will appear from the following description taken in connection with the drawing, which forms a part of this specification, and in which:

Fig. 1 is a plan view of a motor vehicle chassis having my invention incorporated therewith;

Fig. 2 is an enlarged view, partly in section, of a portion of a braking system by means of which fluid is placed under pressure;

Fig. 3 is a fragmentary sectional view of a portion of the mechanically driven pressure means and control mechanism therefor taken on line 3—3 of Fig. 2;

Fig. 4 is a sectional view of the mechanical drive and control mechanism therefor taken on line 4—4 of Fig. 2;

Fig. 5 is a sectional view of the mechanical drive mechanism taken on line 5—5 of Fig. 2;

Fig. 6 is a view similar to Fig. 5 with the mechanism arranged in a driven position.

Referring now to the drawing by characters of reference, 10 indicates the chassis frame of a motor vehicle with which a front axle 11 and a rear axle 12 are associated in a conventional manner. Wheels 13 are mounted on the ends of the front axle and wheels 14 are associated with the rear axle in a relation to be driven by mechanism contained therein. An internal combustion engine 15 is suitably supported upon the chassis frame and has the usual clutch contained within a housing 16 to transmit power from the engine crankshaft to the driven transmission shaft 17 contained within the housing 18. Between the shaft 17 and the clutch is arranged conventional gear mechanism by means of which the shaft 17 is rotated at various speeds relative to the speed of the crankshaft rotation. A propeller shaft 19 is connected in a conventional manner with a sleeve 20 splined on the driven shaft 17 and the propeller shaft transmits power to the mechanism contained within the rear axle housing 12 for driving the wheels 14.

Associated with each of the wheels is a brake drum 21 and associated with each brake drum is a pair of pivotally mounted brake shoes 22. With each pair of brake shoes is associated mechanism adapted to be expanded for applying the shoes to the drums 35 and to be contracted for releasing the shoes from the drums. Such brake mechanisms are arranged to be actuated by a hydraulic system comprising conduits containing fluid. The front brake mechanisms are connected by a conduit 23 and the rear mechanisms are connected by a conduit 24. Connecting these conduits 23 and 24 is a conduit 25 extending longitudinally of the vehicle.

Associated with this fluid system for applying pressure to actuate the brake mechanisms is a means comprising a casing 26 having a piston 27 therein and a fluid reservoir 28 communicating at 29 with the interior of the casing. A suitable connection 30 establishes communication between the fluid conduit 25 and the interior of the casing. Associated with the piston is a rod 31 pivoted at 32 to the brake foot lever 33, such lever being mounted in the usual manner on a shaft 34 suitably fixed on the chassis.

The vehicle and braking system so far described are of a conventional type except that the piston 27 and its casing are much smaller in diameter than those heretofore employed. Ordinarily the application of physical force by the driver against the foot lever 33 will move the rod 31 and the piston 27 toward the left, as viewed in Fig. 2, creating pressure against fluid in the conduits and thereby expanding the brake mechanisms 35 to engage the shoes 22 with the brake drums on the wheels.

Ordinarily, with a braking mechanism of the described type, the driver is required to exert the entire force used to apply the brakes and to many drivers the extent of this force application is undesirable and to the average driver the application of force required for applying the braking system in heavy traffic is fatiguing.

In order to relieve the driver of some of the physical effort now required in applying a braking system, I propose to associate with such system a mechanically driven fluid pressure applying means under the control of the foot lever. This mechanically driven means is arranged so that it can be made effective whenever the vehicle is moving. In order to accomplish this the auxiliary pressure means is arranged to be driven from the shaft 17 which always is in positive driving relation with the rear axle or can be clutched to be driven by the engine whenever it is operating.

A housing 40 for this drive mechanism is secured to the end of the transmission casing 18 by bolts 41. Shaft 17 extends through this housing and splined thereon, within the housing, is a clutch drive disk 42 having a friction ring fixed around the rear face thereof. Telescoping a forwardly extending sleeve flange of the housing 40 is a shiftable driven clutch element 43, this element being movable axially and being oscillated when moved to engage against the clutch disk 42. On the periphery of the shiftable driven clutch disk 43 is formed a pair of similar cam lobes 44 and 45. This cam lobe peripheral portion of the driven clutch disk engages a roller 46 carried by the inner end of the piston rod 47 which extends through and is guided by a sleeve 48 formed as a part of the casing 40.

Associated with the fluid system is an auxiliary pressure means consisting of a casing or cylinder 49 in which is mounted a plunger 50. A suitable connection 51 establishes open communication between the interior of the cylinder 49 and the conduit 25. By moving the driven disk 43 axially into engagement with the driving disk 42 it will be oscillated to cause one of the lobe portions to move the same in a direction to operate the piston 50 in a direction to exert pressure against fluid in the braking system.

This clutch drive is under the control of the foot pedal 33 and the clutch is controlled to cause actuation of the plunger 50 concurrently with the physical actuation of the piston 27 and by means of the same lever movement. In order to so control the clutch of the driving mechanism for the piston 50 I provide a fluid conduit 53 which is connected at one end with a casing 54 having a reservoir 55 in open communication therewith and containing a piston 56. Associated with the piston 56 is rod 57 which is pivoted to the foot lever as indicated at 58. The other end of the fluid conduit 53 extends through the rear wall of the casing 40 and is arranged in open communication with an expansible stiff metal diaphragm means 59. Ring members 60 are fixed to the forward and rear ends of the diaphragm means and on the forward peripheral face of the front ring is fixed a pair of cam elements as indicated at 61. The rear ring member 60 is suitably fixed to the rear wall of the casing 40. The clutch member 43 is provided with flanges 62 for carrying shafts 63 on which rollers 64 are mounted. There are two of such rollers and they are arranged diametrically and normally engage on the highest points of the cam elements 61, that is the foremost extending portions thereof when the clutch element 43 is in disengaged position as shown in Fig. 2.

The brake system as shown in Fig. 2 is in released position. Foot pressure against this pedal 33 oscillates the same to move the rod 31 forward and the rod 57 rearward. Piston 27 moves forward with the rod 31 to create pressure against fluid in the conduits 23, 24 and 25. Piston 56 moves rearwardly with rod 57 and creates pressure against the fluid in conduit 53 to expand the diaphragm 59 axially. Before expansion of the diaphragm rollers 64 engage the peak portions of cams 61, as shown in Fig. 3, and retain such relation until the expanding diaphragm moves the clutch member 43 into engagement with the driven clutch element 42. Engagement of the element 43 with element 42 causes it to turn and thus move the rod 47 and piston 50 in a direction creating pressure on the fluid in the conduits 23, 24 and 25. Turning of the cam 43 changes the position of the rollers 64 with respect to the cams 61 so that the rollers ride down the cams in a direction away from the peak portions until the member 43 is no longer held in driven engagement with the drive cam member 42. Of course the extent of the diaphragm expansion axially determines the position of the cams, and further pressure against the pedal will increase the pressure applied by piston 27 and will also move piston 56 to further expand the diaphragm thus moving the cams 61 to again engage the clutch member 43 with the drive member 42 and thereby further move the piston 50 in a direction exerting more pressure on the fluid in the system. The operator can feel the position of the brakes when the pedal is depressed because the reaction of pressure in the system will be transferred through the piston 27 and rod 31 to the foot lever. He will thus know to what degree the brakes are applied. The two cam surfaces 44 and 45 serve to actuate the piston 50 in the same manner upon engagement of the clutch element 43 with element 42 in either direction of the rotation of shaft 17. The action of fluid pressure against the piston 50 reacts on the roller 46 creating a force sufficient to urge the clutch member 43 back to the neutral position, as shown in Fig. 5, where the rollers 64 will bear against the foremost portions of cams 61. Spring 73 holds the piston 50 against its rod 47 and exerts a force sufficient to retain roller 46 in its neutral position, as shown in Fig. 5, when the pressure in the system is low. In this manner the clutch mechanism is moved to ineffective position, as shown in Figs. 3 and 5, when the foot lever 33 is moved in a direction to retract the diaphragm.

Spring 71 holds piston 27 against its rod 31 and spring 72 holds piston 56 against its rod 57. Upon release of the foot lever conventional springs (not shown) can be used to swing the brake shoes away from their drums and the lever will be returned to position shown in Fig. 2 by spring 70 suitably fixed to a part of the chassis. Pressure on the fluid in the system is now entirely relieved.

In any fluid system there must be a certain fluid displacement to accomplish brake application and with the present invention the displacement of fluid by the mechanically driven piston lessens by that amount the displacement required by the application of physical force. As a result a small cylinder and piston can be utilized for the physical pressure application thereby relieving the motor vehicle driver of much of the energy requirement previously needed. With this system, the driver can apply the brakes with minimum effort.

Although the invention has been described in connection with a specific embodiment, the principles involved are susceptible of numerous other applications which will readily occur to persons skilled in the art.

What is claimed is:

1. In a brake system, a brake, a closed liquid system for applying said brake, a pair of independent plungers operable to create pressure on the liquid in said system, power driven means operable to move one of said plungers in a direction creating pressure on the liquid in said system, physically operable means connected to move the other of said plungers in a direction creating pressure on the liquid in said system, and a fluid pressure controlled clutch means for said power driven means controlled by said physically operable means in its plunger operating movement.

2. In a brake system, a brake, a liquid system connected to apply said brake when pressure is applied to the liquid, a pair of separate means each operable to create pressure on the liquid in the system for applying said brake, physically operable means connected to actuate one of said pressure creating means, power means operable to actuate the other pressure creating means, and clutch control means for the power means under control of said physically operable means.

3. In a brake system, a brake, a closed liquid system connected to apply said brake when pressure is applied to the liquid, a pair of separate means each operable to create pressure on the liquid in the system for applying said brake, physically operable means connected to one of said pressure creating means, power means including a clutch operable to actuate the other pressure creating means, a pedal connected to said physically operable means for actuating the same, and means under the control of said pedal operable to control said power means clutch whereby said power means is controlled by movement of said pedal.

4. In a brake system, a brake, conduit means containing liquid for applying said brake when pressure is applied thereto, a pair of cylinders open to the conduit, a plunger in each cylinder, a physically operable means for actuating one of said plungers to create pressure on the liquid in said system, power means including a clutch operable to actuate the plunger in the other cylinder, and fluid pressure control means for the power means clutch connected to be controlled by the operation of said physically operable means.

PETER F. ROSSMANN.